Feb. 13, 1968    R. E. PERKINSON ET AL    3,369,239
AIR TRAFFIC CONTROL AND MONITORING SYSTEM
Filed Nov. 19, 1964    5 Sheets-Sheet 1

INVENTORS
ROBERT E. PERKINSON
MARTIN J. BORROK
WILBUR H. VON FANGE
FRANK E. CHRISTOFFERSON
JAMES E. BLOUIN
BY Gravely, Lieder & Woodruff
ATTORNEYS INVENTORS
ROBERT E. PERKINSON
MARTIN J. BORROK
WILBUR H. VON FANGE
FRANK E. CHRISTOFFERSON
JAMES E. BLOUIN
BY Gravely, Leedy & Woodruff
ATTORNEYS

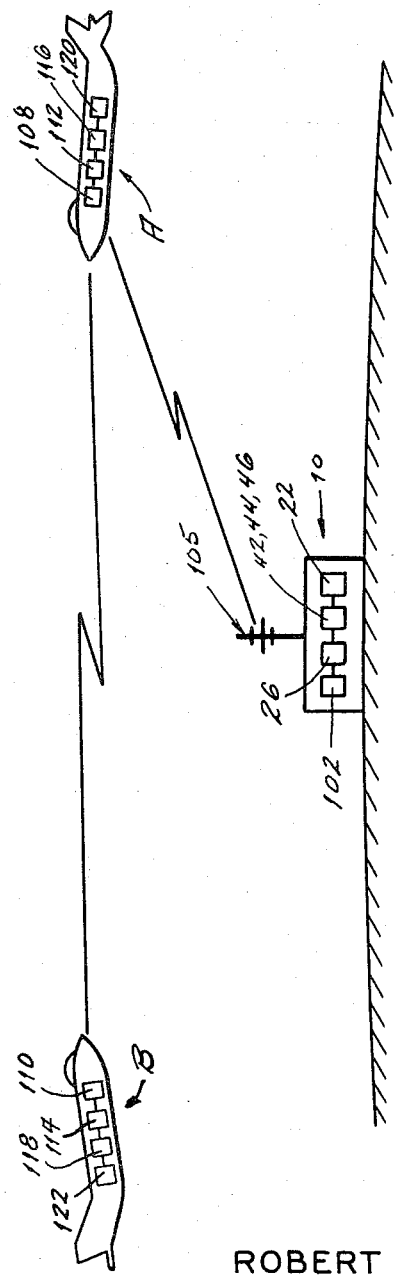

United States Patent Office 3,369,239
Patented Feb. 13, 1968

3,369,239
AIR TRAFFIC CONTROL AND
MONITORING SYSTEM
Robert E. Perkinson, St. Louis County, Martin J. Borrok, Berkeley, Wilbur H. von Fange, Kirkwood, and Frank E. Christofferson, Richmond Heights, Mo., and James E. Blouin, Godfrey, Ill., assignors to McDonnell Aircraft Corporation, St. Louis County, Mo., a corporation of Maryland
Filed Nov. 19, 1964, Ser. No. 412,368
18 Claims. (Cl. 343—112)

The present invention relates generally to monitoring and control means particularly for monitoring and controlling air traffic in a predetermined area. More particularly the invention relates to a ground station capable of monitoring air traffic and capable of providing cooperating aircraft within the range thereof with accurate information from which each airplane will be in condition to determine potential collision threats and be warned in advance to take appropriate maneuvers to avoid collision whenever necessary.

Ever increasing numbers of airplanes are making use of and congesting the airways and are presenting increasing hazards to all who fly. It is therefore increasingly important that means be provided both in airplanes and at ground locations to gather and disseminate information from which pilots are warned in advance of collision threats. It is also important to monitor the airways in order to prevent dangerous conditions from arising and to be able to schedule flights along the safest and most direct routes and altitudes.

To effectively monitor the airways, the ground equipment must obtain information as to the locations, altitudes, bearings, speeds, changes in altitude, and changes in the relative positions of airplanes, particularly airplanes flying at or near the same altitudes. It is also important that the ground equipment be able to identify each airplane in its area and be able to communicate therewith and the ground equipment must also be able to accept new airplanes entering its control area and eliminate from its control and other functions airplanes which are departing therefrom. In other words, to be effective the ground station must obtain all the information possible about the location of every airplane within its sphere of control and be able to use this information quickly and accurately to monitor and schedule flights. The ground station should be able to do all of these and other things withouts requiring any positive acts by the personnel involved, particularly the airborne personnel. The ground station does, however, include means for communicating certain information to the cooperating airplanes which enable all planes to be synchronized which is essential to effectively avoid collisions and to make the information transmitted between the airplanes and the ground station accurate. So far as known, there never has been a ground station capable of performing all of the above and other functions, which station operates entirely in real time and is maintained in an updated condition at all times.

The present invention comprises a ground station capable of performing all of the above and other functions and includes transmitting and receiving means, precision time keeping means, direction finding means, range determining means, means for identifying airplanes and for assigning distinct transmitting times to each, altitude decoding means, means for displaying the locations and relative locations of cooperating airplanes, means for selectively identifying planes flying at or near the same altitude, means for identifying unknown planes and for including them in the system, means for discriminating between valid and invalid signals, and means for updating all information used in the system every few seconds.

A principal object of the present invention is to provide improved means for monitoring air traffic.

Another object is to provide a central control station with information from which it can monitor and schedule airplanes safely and expediiously.

Another object is to provide means for automatically updating information as to the location, altitude, bearing and changes therein of airplanes and the like.

Another object is to provide a greater amount of information about airplanes flying in a given area.

Another object is to simplify the gathering of information from which to schedule and monitor air traffic.

Another object is to provide a collision avoidance system including airborne and ground units which all operate on the same frequency.

Another object is to provide means for maintaining all cooperating units of a diverse system in precise time synchronization.

Another object is to provide a relatively simple yet versatile air control system which operates in real time and therefore does not require complicated storage, computing and other components.

Another object is to provide an air control system which requires minimum attention.

Another object is to provide a system which permits the simultaneous repeated gathering of information from all cooperating airplanes regardless of the number.

Another object is to provide a system which operates compatibly with other known equipment and which greatly increases the amount of information available therefrom.

Another object is to provide a relatively inexpensive air monitoring system in relation to the amount of information obtainable therefrom.

Another object is to devise a system which eliminates problems of mutual interference between signals from different airplanes.

The subject invention resides in a ground station for monitoring air traffic by transmitting and receiving signals between the subject ground station and all cooperating aircraft within radio range thereof. The ground station and each cooperating aircraft are equipped with precision time keeping means, and the ground station includes means responsive to the output of the time keeping means thereat for establishing repeating time periods for monitoring purposes and means for subdividing said repeating time periods into a plurality of individual distinct time intervals or message slots which are respectively assigned to the individual cooperating aircraft as their message slots. The assignment of particular message slots to particular aircraft is controlled by means in the subject ground station. The subject ground station also includes means by which the time keeping means located in the various cooperating aircraft can be synchronized to the time keeping means at the ground station so that all units are in synchronism, and the subject ground station includes means for receiving and responding to signals from the various aircraft during their assigned message slots to produce a visual display of the aircraft in proper relationship to the ground station and to the other aircraft. Still further, the subject ground station includes means for identifying particular aircraft from the visual display, means for identifying and monitoring newly arrived aircraft entering the control area of the ground station including means for assigning message slots thereto, means for making available for reassignment message slots previously assigned to aircraft that have departed from the conrtol area, and means for monitoring aircraft by message slot, by altitude, by range, by range rate and by bearing.

These and other objects and advantages will become apparent after considering the following detailed specification which covers a preferred form of the invention in conjunction with the accompanying drawings, wherein.

Figure 3A:
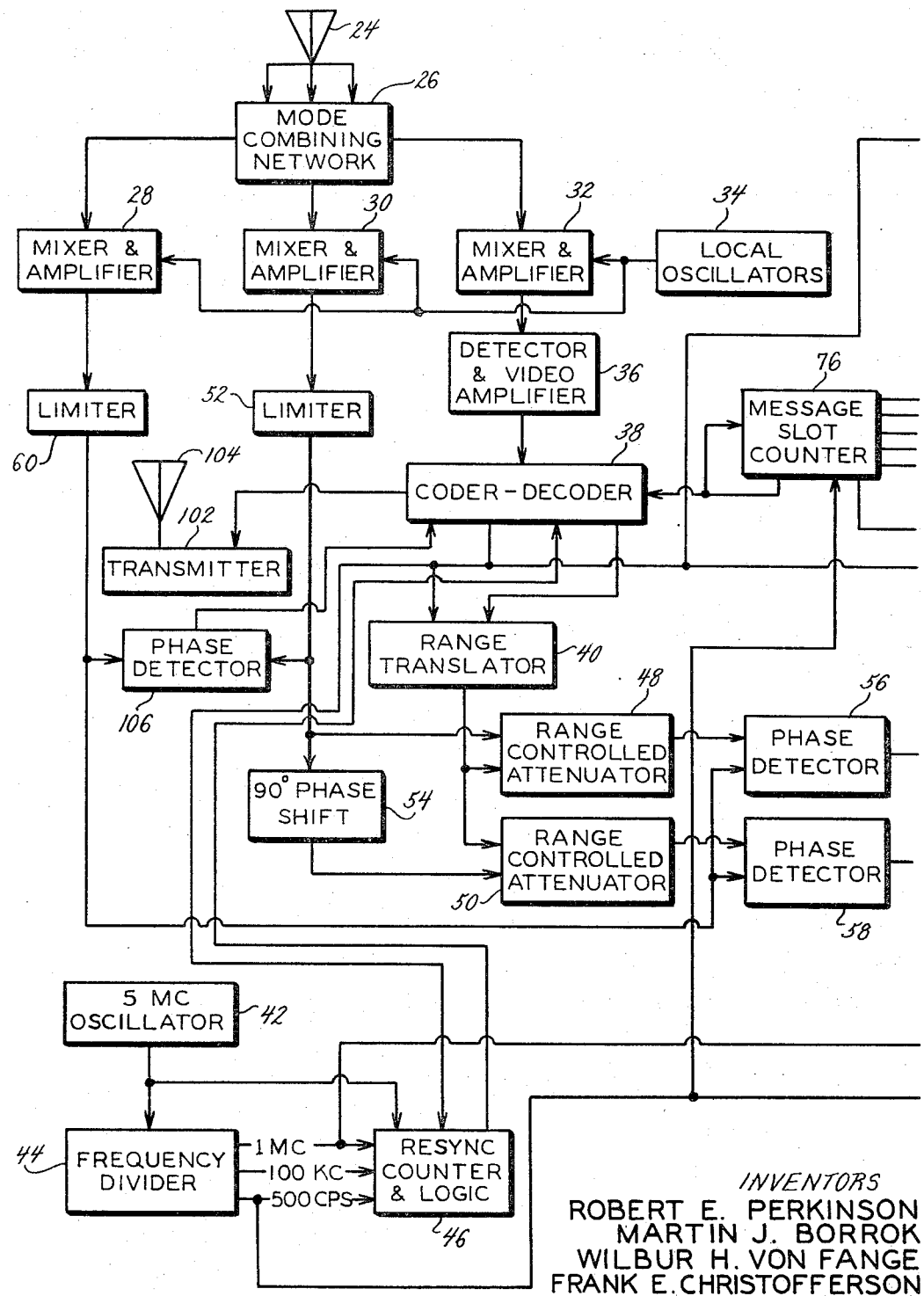
Figure 3B:
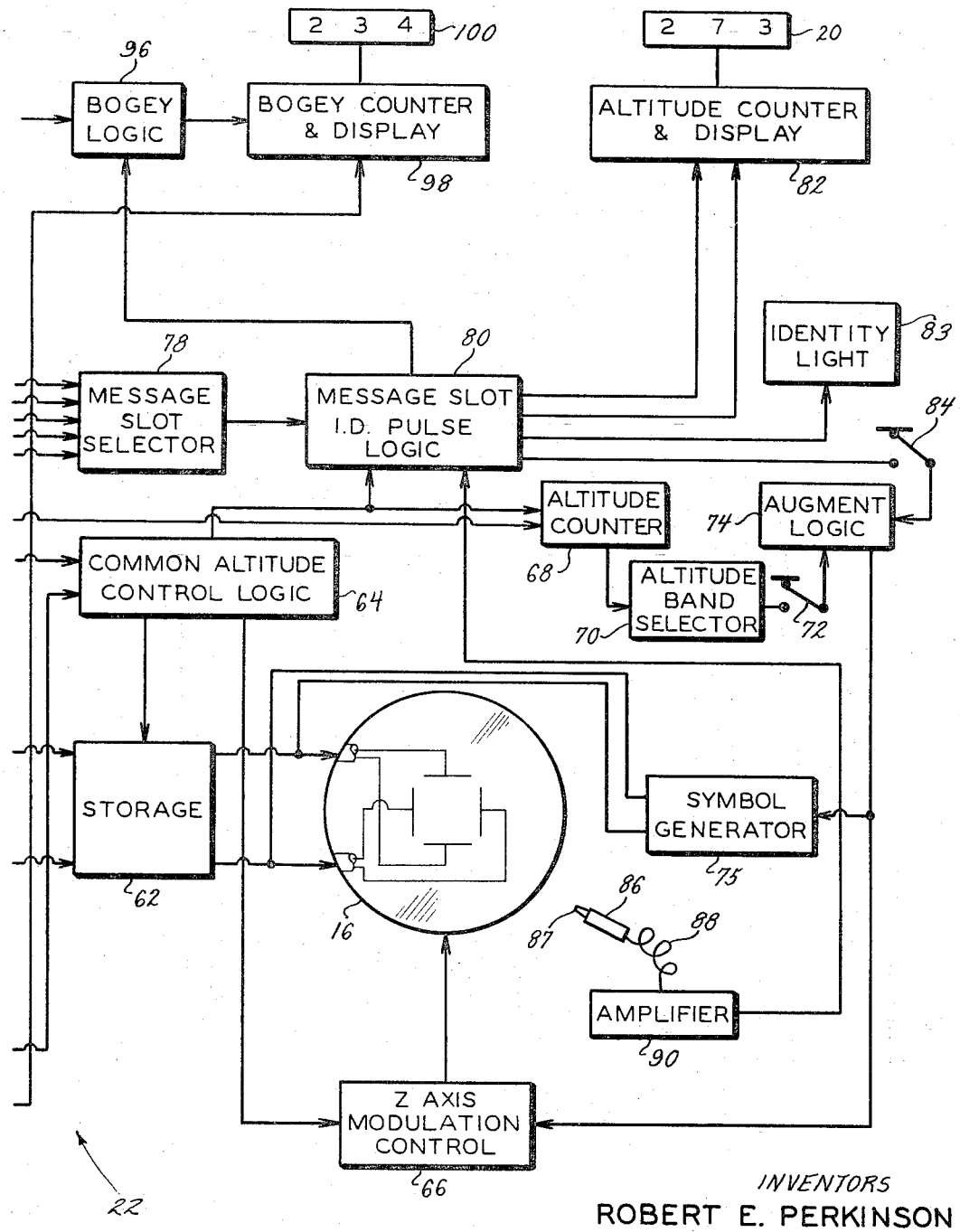

FIGS. 3A and 3B together are a block diagram of a circuit constructed according to the present invention and, FIG. 4 is a simplified block diagram of the present ground station and a pair of cooperating airbrone stations.

Referring to the drawings by reference numbers, the number 10 refers to a ground station constructed according to the present invention. The ground station includes a housing 12 having a control panel 14 with a cathode ray tube 16 centrally located thereon. The tube 16 may be a typical cathode ray tube preferably a storage type tube used to display the geographic positions of the aircraft within range of the ground station. On both sides of the tube 16 are located rows of control devices which are used to identify particular airplanes and to indicate the altitudes at which they are flying. In alignment with each control position is provided space for a removable ticket 17 on which can be recorded pertinent information about an airplane. The control positions include means 18 for identifying each airplane by its assigned transmission time and other means 20 for recording the altitudes of the corresponding airplanes. The altitude recording means 20 are labeled Flight Level and the airplane identification means 18 are labeled MSG slot.

FIG. 3 is a detailed block diagram of circuit 22 employed in the subject ground station. The circuit includes a direction finding antenna 24 which receives signals from cooperating airplanes and feeds them to a mode combining network 26. The network 26 produces a plurality of constant amplitude outputs which vary in phase relationship depending upon the direction of arrival of the received signals at the antenna 24. In the embodiment shown, the mode combining network 26 produces three separate outputs, one of which is fed to mixer-amplifier circuit 28, a second to mixer-amplifier circuit 30, and the third to mixer-amplifier circuit 32. The circuits 28, 30 and 32 also receive signals from local oscillators 34.

The output of the mixer-amplifier circuit 32 is fed to a detector-video amplifier circuit 36 which processes these signals and produces an output which is then fed to a coder-decoder circuit 38. The circuit 38 tests the incoming detected signals and determines if they are valid signals or merely noise. One such test is to require that each incoming signal be continuously present for a predetermined time period after which an output will be produced if the conditions are fulfilled to verify that the signal is a valid signal. The coder-decoder circuit 38 produces an output for each verified video signal which is applied to a range translator circuit 40. The range translator circuit determines the range from the ground station to each transmitting airplane. This is done by comparing the time of arrival of each signal from an airplane during its assigned transmitting time with a predetermined time at the ground station. The range translator circuit 40 may be a voltage ramp generator which generators a constantly increasing voltage during each message slot, which voltage is started by a range-zero pulse also from the coder-decoder circuit 38. In the actual circuit, the range-zero pulse may be delayed by a time period sufficient to enable the circuit 38 to verify that the incoming signals are valid signals. The range-zero pulses from the coder-decoder circuit 38 are produced by signals from an accurate time standard included in the ground station. The time standard is also used for other purposes including providing signals for synchronizing the equipment in all cooperating aircraft within range of the subject ground station. This includes transmitting timed pulses during the message slots. The synchronizing means are fully disclosed in the Perkinson et al. Patent No. 3,250,896 entitled Synchronizing Means For Remotely Positioned Timing Devices, assigned to the same assignee.

The time standard employed in the subject device is identified in FIG. 3 as oscillator 42. The output of the oscillator 42 is connected to a frequency divider circuit 44 and to a resync counter and logic circuit 46. Other forms of accurate time keeping devices such as atomic clocks and the like can be substituted for the oscillator 42 as long as the precise time keeping accuracy is maintained. The resync circuit 46 has both an input and an output connection to the coder-decoder circuit 38 as shown in the drawing. This is done to provide the necessary outputs after a verified input signal is detected. The accurate time keeping means include the three connected circuits 42, 44, and 46 and the combination thereof serves a variety of purposes in the subject ground station as will be described.

The voltage ramp generated by the range translator circuit 40 will be stopped and clamped upon receipt of each verified input signal from the circuit 38. A voltage proportional to the clamped ramp voltage is then present at the output of the circuit 40 and is applied simultaneously to two range controlled attenuator circuits 48 and 50. The attenuator circuit 48 also receives another input from the output of the mixer-amplifier circuit 30 through a limiter circuit 52. The output of the limiter circuit 52 is also fed to a phase shift circuit 54 which phase displaces it by 90° to provide a second input to the variable attenuator circuit 50. The outputs of the attenuators 48 and 50 are then fed respectively to phase detector circuits 56 and 58 each of which also receives a second input from the mixer-amplifier circuit 28 through another limiter circuit 60. The two input signal components are thus limited or clipped in the circuits 52 and 60 and the outputs of the circuits 52 and 60 are signals having the same frequency but differing in phase by a phase angle equal to the arrival angle of the incoming signal at the direction finding antenna 24. It may also be necessary or desirable to include means for balancing the outputs of the circuits 28 and 30 due to delays caused by the physical characteristics and construction of the circuits and circuit elements. The outputs of the attenuators 48 and 50 are caused to vary in amplitude depending on range. For example, a short range will give a low amplitude and a long range a higher amplitude, the amplitude in every case being accurately proportional to range.

The phase detector circuits 56 and 58 process the signals from the attenuator circuits 48 and 50, respectively, by acting substantially as on-off switches under control of the reference signals from the limiter circuit 60. The detector circuits 56 and 58 act to block one-half of the sine wave signals supplied from the circuits 48 and 50, and the particular portions of the sine wave signals to be blocked is controlled by the phase relationship between the signals from mixer-amplifier circuit 28, which is the reference input signal, and the aforementioned sine wave signals. The outputs of the circuits 56 and 58 are filtered D.C. signals whose amplitudes are a function of the phase relationship between the signals in the circuits 28 and 30. The output of the detector 56 more specifically is a D.C. voltage, the amplitude of which is a function of the range multiplied by the sine of the bearing or arrival angle of the signal received at the antenna 24. The output of the detector 58, on the other hand, is a D.C. voltage, the amplitude of which is proportional to the range multiplied by the cosine of the same arrival angle. The outputs of circuits 56 and 58 are fed to a storage device 62 which in turn applies them at the proper times to the X and Y deflection plates or coils of the cathode ray tube 16.

The circuit 64 includes means for controlling clamping of the X and Y range voltages prior to the end of the transmission times assigned to each airplane. At these same times, the circuit 64 applies a signal to the Z axis modulation control circuit 66 to increase the intensity of the cathode ray tube beam that forms the blips on the face of the tube. The cathode ray tube 16 itself, as already noted, may be of a conventional construction. The two deflection voltages are proportional to the X and Y components of the location of the transmitting airplane and produce a blip on the face of the tube 16 at the location corresponding thereto. Each cooperating airplane within the range of the ground station will be similarly displayed.

As already noted, each cooperating airplane is assigned a message slot or transmitting time in each repeating time period that distinguishes and identifies it from all other airplanes. During its assigned messages slot each plane transmits information to the ground station and to other planes as to its location and altitude. The time of these transmissions enables the ground station and the other planes to determine the range to the transmitting plane and enables the ground station to identify each plane by its transmitting time. Therefore, during each repeating time period, which may be a few seconds or so in duration, all cooperating planes will transmit and all this information will be continuously displayed and made available at the ground station and at other planes. In this connection, it is important to note that similar circuits are used at the ground station and in each plane to process the signals that are received. This is possible because all units including the ground station transmit on the same frequency but each transmits at a different assigned time. This also means that all units of the subject system are able to operate entirely in real time and do not require any complicated costly computing and storage means. This greatly simplifies the structural and operational details and substantially reduces the cost. It is anticipated, however, to provide means to preserve the images appearing on the tube 16 long enough so that they appear to be continuous. Preservation of the images is accomplished by using a storage type cathode ray tube.

The circuit 64 produces a train of pulses at a fixed rate, for example, one megacycle, commencing at a predetermined time after the leading edge of each incoming signal from an airplane. This train of pulses is stopped upon receipt of the incoming altitude signal. The circuit 64 includes means for counting at a predetermined rate beginning upon receipt of a verified video signal from the coder-decoder circuit 38, and stops when the correct predetermined count is reached. This results in a fixed delay which is the same in each message slot and is used to establish an altitude code time of zero feet or sea level. At this time the gate which controls the train of pulses previously described is opened allowing pulses to pass until the arrival of the incoming altitude signal which closes the gate. This results in a gated train of pulses in which the number of pulses correspond exactly to the altitude. This train of pulses is fed to the altitude counter 68 where the pulses are counted and the count stored until the end of the message slot, at which time the counter 68 is closed by an end of message slot signal from the message slot counter 76.

The condition of the altitude counter 68 may be sensed by an altitude band selector circuit 70. If an altitude which has been set into the circuit 70 corresponds to an altitude determined by the altitude counter 68 an enabling pulse will be produced at the output of circuit 70. This enabling pulse will be fed to, and if closed, through a manual on-off switch 72 to a gate circuit 74 which may be an "or" gate. The gate 74 may also be activated by a second input from a circuit which will be described later. If the gate 74 is properly energized it will produce an output which is fed to a symbol generator circuit 75 and to the Z axis modulation control circuit 66. When a signal is fed to the symbol generator 75 it will produce an alternating current output which will be applied to the X and Y deflection means in the tube 16. These signals in turn will generate circles or other symbols to identify particular blips on the scope which correspond to the selected altitudes. The signals generated by the symbol generator 75 produce well known lissajous figures or patterns such as circles or crosses at the selected blips to identify them. The result of this operation is to identify by appropriate symbols on the scope all airplanes flying at or near an altitude selected by the setting of the altitude selector circuit 70. The operator of the ground station will therefore be able to produce a visual representation of the locations of all airplanes within the monitoring range of the station that are flying at or near a particular altitude, and this can be done quickly and simply by dialing in the altitude that he desires to check. In addition, this same equipment can be used to read out on a separate scope (not shown) only those blips which come from airplanes at the selected altitudes.

As already mentioned, the accuracy, versatility and reliability of the subject system is due to the precise synchronism maintained for all units. In practice, precision oscillators having a maximum possible deviation rate of approximately one part in $10^{10}$ per 24 hours have been used and proved very satisfactory and reliable. Also in an actual embodiment, an oscillator frequency of 5 megacycles has been used with excellent results. The output of the oscillator 42 is fed to the frequency divider circuit 44 which produces several different outputs all of which are coherent with the oscillator frequency. For example, for a 5 megacycle oscillator frequency the divider circuit 44 may be constructed to produce three sub-frequency outputs including a 1 megacycle output, a 100 kilocycle, and a 500 cycle output.

The 500 cycle output is used to establish the individual message slots and is fed to a message slot counter circuit 76 which includes decimal counter means to accumulate the 500 cycle counts. The message slot period in this particular embodiment is then 2,000 microseconds, which is the period of the 500 cycle frequency divider output.

Figure 1:
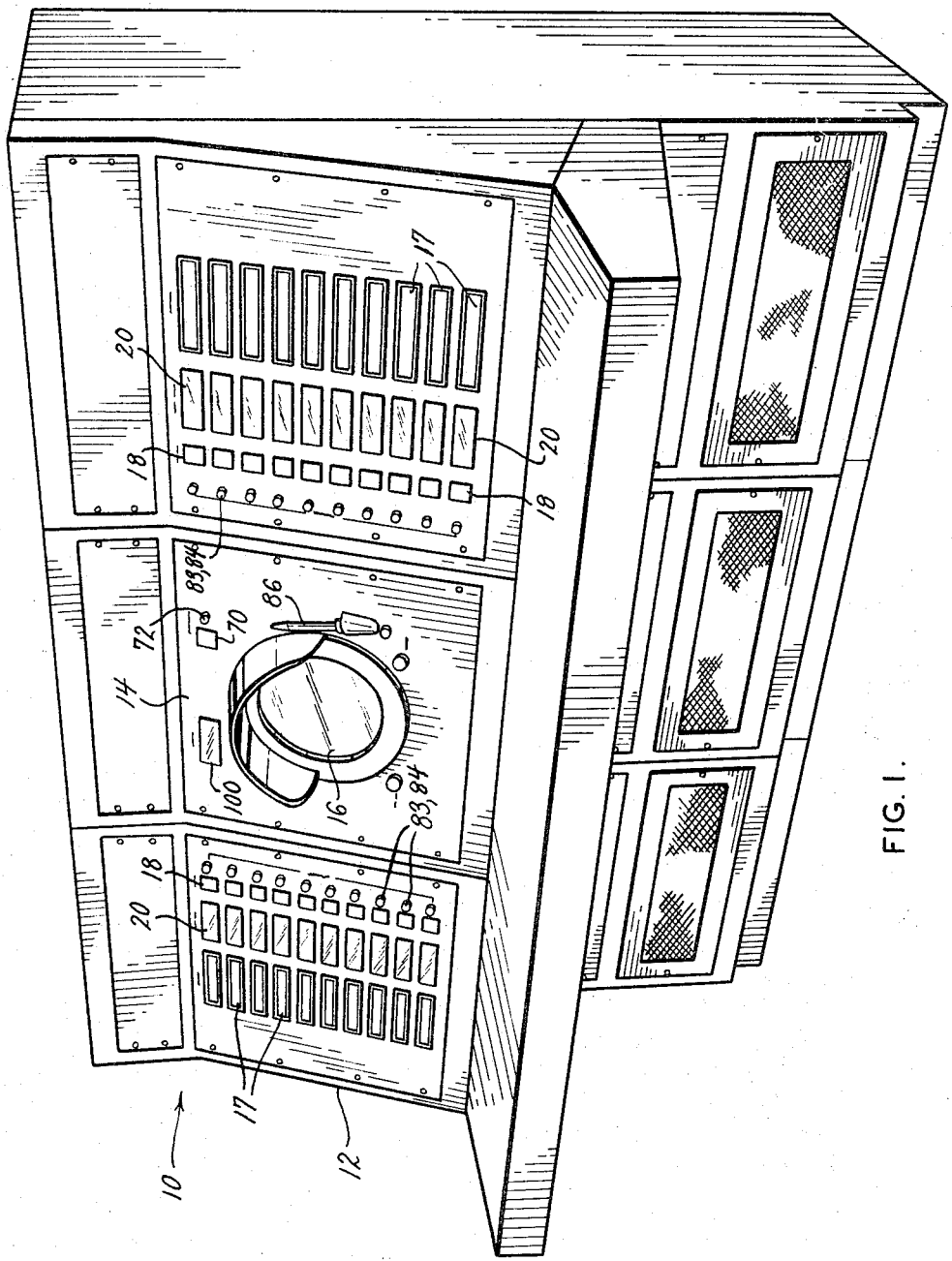
FIG. 1 is a front view of a ground station constructed according to the present invention.
Figure 2:
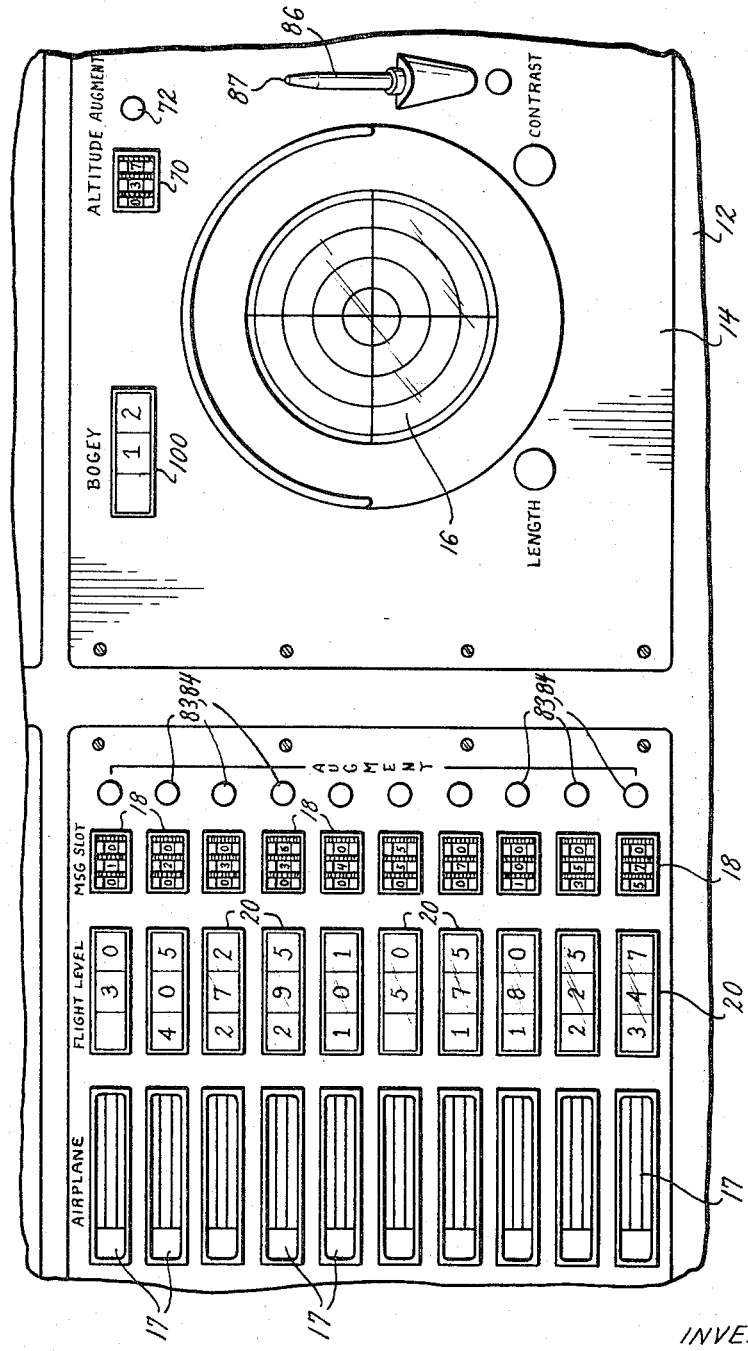
FIG. 2 is a close up of some of the controls of the subject station.

The ground station includes a plurality of mesage slot selector positions or switches 18 (FIGS. 1 and 2), all or part of which can be dialed in and used at any one time. The number of such positions will depend on the anticipated traffic and can be expanded to include every assignable message slot although this is usually not necessary or desirable. The message slot selector switches 18 are embodied in a message slot selector circut 78 which is connected to the output of the message slot counter 76. Each switch position 18 includes a plurality of ten position thumb wheel switches or the like, each wheel of which can be individually manually rotated to set into its position one digit of any desired message slot number. For example, if three ten position thumb wheel switches are provided for each message slot position any message slot from 000 to 999 can be dialed and assigned. When a switch position 18 is set to a particular message slot number corresponding gate circuits are actuated which enable the operator to obtain information about the selected plane. This information will be updated and available everytime the count in the message slot counter 76 reaches the selected number dialed into the particular switch position 18. The way this happens is that every signal corresponding to a selected message slot will produce a change in the state of an associated gate, and this change will in turn produce a corresponding change in a message slot identification circuit 80 to allow the altitude count from the altitude control circuit 64 to be fed into an altitude counter and display circuit 82. This same signal will cause the altitude counter 82 to count at a 1 megacycle rate until the altitude count for the particular airplane has been accumulated. This count is then displayed by other means such as by the numeric display device 20 positioned adjacent to the selected message slot on the control panel. The display will persist until the message slot counter 76 again reaches the same selected message slot. The output of the counter 82 can also be used as an input to a stored program computer. This is relatively easy to do because the information is time ordered. This is not true of information obtained by radar and like means. This means that the operator at the ground station can select and read into any of the positions 18 any desired message slots and can also observe the altitude of the selected planes at the corresponding position 20. This is in addition to being able to identify particular airplanes by transmission time or altitude by making a symbol on the scope at the selected blip.

At the start of each succeeding message slot a reset signal is applied to the circuit 82 to reset it to zero in preparation for the next succeeding altitude count. Any number of altitude counters and display devices similar to the circuit 82 can be provided at the ground station depending upon the capacity desired. The number of such circuits also determines the number of message slots (or airplanes) that can be monitored at the same time, and hence the number of selected airplane altitudes that can be read simultaneously.

The message slot circuit 80, in addition to the above functions, produces output signals which are fed through another on-off switch 84 to the second input of the "or" gate circuit 74. When the switch 84 is closed it enables the device to identify by appropriate symbols only those blips corresponding to the selected message slot positions. An output signal from the selected altitude band selector 70 may also establish a set of conditions for energizing the symbol generator 75 as previously described. It is also possible with slight modification to identify airplanes by range, range rate and other parameters. The subject device is therefore extremely versatile and flexible.

Other means are provided at the ground station for identifying particular blips on the scope 16 including a pencil-like device 86 with a light sensitive head 87. The device 86 is connected by a flexible cable 88 to an amplifier circuit 90. When the light sensitive head 87 is positioned adjacent to a particular blip on the scope 16 it will produce a signal which is amplified by the circuit 90 and fed to the message slot identification circuit 80. This signal occurs during the message slot assigned to the airplane corresponding to the selected blip and is presented to each of the message slot channels in the circuit 80. When the message slot corresponding to the selected blip is dialed into one of the available message slot selector positions 18, the corresponding identification light 83 will be turned on. It is therefore possible using the pencil 86 to identify particular airplanes by their blips adding to the flexibility and versatility of the subject device. The lights 83 can be housed within corresponding switches 84 for each selectable position.

It is also important to be able to know when an airplane is transmitting legitimate verified signals in a message slot which has not been selected on the control panel. For this purpose a bogey message slot circuit 96 has been provided. The bogey circuit 96 receives verified input impulses from the output of the coder-decoder circuit 38. The bogey circuit 96 also receives inputs from each position of the message slot identification circuit 80. If there is no active input indicating the presence of a selected message slot when a verified signal is received by the circuit 96, an output is then produced in the bogey circuit 96 which is used to stop a bogey counter and display circuit 98. The circuit 98 is a message slot counter circuit similar to the circuit 76 which counts at the 500 pulse per second rate established in the output of the frequency divider 44. The bogey counter 98 is reset to a zero count at the beginning of each message slot the same as the message slot counter 76, and it performs the same functions with respect to the information it receives from the non-selected airplanes as the circuit 78 does with respect to information received from the selected airplanes. Furthermore, whenever the bogey counter 98 is stopped by an output signal from the bogey circuit 96 it will display this information on the control panel by energizing a bogey numeric display device 100. The circuit 98 includes means to prevent reset for a predetermined time to allow time for the operator to record the information displayed by the device 100 and take the necessary steps to identify the non-selected airplane by message slot number. Additional bogey circuits can also be provided and can be arranged to display information as to more than one non-selected airplane within the range of the system. The bogey identification therefore provides means for alerting the ground station operator of the presence of unknown airplanes and also permits the ground station operator to recognize any error in the transmitting time of an airplane if it should occur.

Means are also provided in the subject ground station for transmitting to cooperating airplanes. The transmitting means include a transmitter circuit 102 and a transmitting antenna 104. The transmitting means are primarily for transmitting timed impulses used by the airplanes for synchronizing purposes. For example, a pulse is transmitted at the beginning of each new cycle of message slots, and resynchronizing pulses are transmitted during individual message slots for synchronizing to the ground station. The synchronizing means are fully described in the Perkinson et al. Patent No. 3,250,896 assigned to the same assignee. The ground station can also transmit range pulses to allow airplanes to measure their distance to the ground station.

FIG. 4 is a simplified view showing the subject ground station 10 with antenna means 105 which include the receiving antenna 24 and the transmitting antenna 104. The ground station also includes the circuits and controls such as are illustrated more in detail in FIGS. 3A and 3B, including the transmitter means 102, receiver means including the mode combining network 26, the resynchronizing and time keeping means 42, 44 and 46, and the circuit and control means generally designated by the number 22. FIG. 4 also shows two airplanes A and B which are similarly equipped with their own respective transmitting and receiving antennas 108 and 110, their control panels 112 and 114, their own time keeping and resynchronizing means 116 and 118, and their own cooperating circuit means including altitude encoding means 120 and 122.

An optional feature of the present device is a phase detector added to the circuit on the input side of the range controlled attenuators 48 and 50. The phase detector 106 measures the difference in phase between the two input signal components received by antenna 24. This phase difference provides a direct measurement of the bearing or azimuth of the airplane relative to the ground station. The output of the phase detector 106 can be a coded signal either in a digital or a pulse position code for transmission back to the airplane involved. This can be done in the later part of the assigned message slot following the synchronization pulse. Since the airplane is already capable of measuring the range to the ground station using the message slot zero pulses or a ground station transmission in an assigned message slot, this additional information would enable the airplane to obtain bearing information. It is also possible to obtain bearing information by converting the outputs of the phase detectors 56 and 58 to digital form or to a pulse position code for transmission back to the airplanes. This would provide the airplane with the X and Y coordinates of its location relative to the ground station which information can be displayed in a suitable plotting device to give a visual presentation.

The present ground station and the system in which it is used offers many advantages not available or obtainable with existing equipment. Many of these advantages are obtained because all of the units in the subject system are synchronized. By being a synchronized system the ground and airborne equipment can be of much simpler construction and operation than any known device for the same or similar purposes. This is made possible by having all of the units operate on the same frequency and in real time rather than stored or delay times, by using one-way instead of two-way transmissions, by having each unit transmit at a different time, and by eliminating interrogations between stations. Furthermore, a synchronized system enables direct measurements or range, affords ready identification and permits dissemination of information, such as altitude, bearing and the like, in an ordered manner which obviates interference. The present system therefore is a highly efficient communication system which produces a great amount of information in an easy to use form including information as to aircraft identification, range, range rate, altitude, and changes in these. Thus in one relatively simple system there has been provided means for performing many more functions and for obtaining a greater amount of information for monitoring air traffic and the like in any known system. Also by obtaining the greater amount of information the subject ground station is able to do a better and safer job of monitoring and scheduling air traffic than has been possible heretofore. The subject ground station can also perform the functions of a radar beacon and distance measuring equipment and at the same time cooperates to provide anti-collision protection for airborne equipment. Thus the subject ground station and system is more versatile than any known and available means and can replace present equipment at reduced cost and with resulting simplification and greater capability. This is true of the ground station as well as the airborne equipment although the present invention related mainly to the ground equipment, the airborne equipment being disclosed in greater detail in copending Perkinson et al. application Ser. No. 409,697 filed Nov. 9, 1964 entitled Airborne Collision Avoidance System and Method, now U.S. Patent No. 3,341,812.

There has thus been shown and described a novel air traffic control and monitoring system which fulfills all of the objects and advantages sought therefor. It will be apparent to those skilled in the art, however, that many changes, modification, alterations, variations and other uses and adaptations for the present invention can be made. All such changes, modifications, alterations, variations and other uses and adaptations which do not depart from the spirit and scope of the invention are deemed to be covered by the invention which is limited only by the claims which follow.

What is claimed is:

1. A ground station for monitoring air traffic and the like comprising signal transmitting and receiving means, precision means for keeping time including circuit means operatively connected to the transmitting means for energizing said transmitting means to transmit signals at preselected times, means responsive to the time keeping means for establishing repeating time periods and means for subdividing said time periods into individual transmitting intervals, means at the ground station for assigning different ones of said intervals to different airplanes, said receiving means responding to signals received from airplanes during their assigned transmitting intervals, display means for prdoucing images at location corresponding to the locations of the respective airplanes relative to the ground station, means connected between the receiving means and the display means for converting the signals received at the receiving means into signal components representing the locations of the airplanes for applying to the display means to produce images thereon at locations corresponding to the locations of the airplanes relative to the ground station.

2. The ground station defined in claim 1 including means connected to the said receiving means and responsive to signals received thereat to verify that each signal received during the assigned time intervals is a valid signal.

3. The ground station defined in claim 1 wherein precision time keeping means are provided in each cooperating airplane, the circuit means at said ground station for energizing the transmitting means thereat transmitting at said preselected times taking into account the time of receipt of signals received from the respective cooperating airplanes.

4. Means for monitoring air traffic comprising a ground station including receiving means capable of receiving signals from cooperating airplanes, and transmitting means for transmitting timed pulses to the cooperating airplanes, an image display tube including deflection means for displaying images of all cooperating airplanes within the range thereof, means for converting signals received from each cooperating airplane to impulses to be applied to the deflection means to produce images on the display tube at locations corresponding to the locations of the cooperating airplanes relative to the ground station, precision time keeping means at the ground station including means for controlling the times of transmission of the impulses from the transmitting means to the cooperating airplanes, other means associated with the time keeping means for establishing repeating time intervals each including a plurality of distinct transmission times, means at the ground station for assigning selected ones of said transmission times to individual cooperating airplanes, and means for selecting certain ones of said airplanes for monitoring.

5. The monitoring means defined in claim 4 wherein said ground station includes means for establishing that a received signal is a valid signal.

6. The monitoring means defined in claim 4 in which the ground station includes means for determining the range to each cooperating airplane from the time of arrival of signals from the cooperating airplanes.

7. The monitoring means defined in claim 4 wherein said ground station includes means for identifying airplanes by their transmission times.

8. The monitoring means defined in claim 4 wherein said ground station includes means for decoding altitude information included in received signals.

9. The monitoring means defined in claim 4 wherein said ground station includes light sensitive means for use in identifying particular airplanes from corresponding images on the display tube and means for producing control signals from the responses of the light sensitive means to the images on the display tube.

10. A system for monitoring aircraft flying in a given area comprising a ground station located within the given area, said ground station and each aircraft including transmitting and receiving means and means for keeping time in the same preselected time periods and at the same frequency, means for periodically checking the synchronization of the time keeping means at each cooperating aircraft and resynchronizing any such time keeping means which have time periods that do not occur simultaneously with the corresponding time periods of the time keeping means at the ground station, means at the ground station for assigning a different distinct time interval in each time period to each cooperating aircraft as its assigned transmitting time, each of said aircraft including means for transmitting in its assigned time intervals information as to its altitude, the receiving means at the ground station receiving transmissions from all said aircraft in the given area, means at the ground station for establishing from the signals it receives the direction each cooperating aircraft is from the ground station and its altitude, other means at the ground station for determining the distance from the ground station to each cooperating aircraft based on the time of receipt of the said aircraft transmissions, means at the ground station capable of selecting certain aircraft for more intense monitoring, and means for displaying the location and altitude of each selected aircraft, said altitude display means including means for identifying all cooperating aircraft flying at or near the same altitude.

11. In the system defined in claim 10 said means for selecting certain aircraft for more intense monitoring include means for identifying aircraft on the display means by assigned message slot and by altitude.

12. In a control system for transmitting and receiving signals between a central station and a plurality of remote stations the improvement comprising precision time keeping means located at the central station, said time keeping means including a time standard and means for dividing the output of the time standard into succeeding similar time periods, means for subdividing each time period into a plurality of individual transmitting times and for assigning different transmitting times to each of said remote stations so that each remote station transmits and receives at a different time from the others, each of said remote stations including means for transmitting on the same frequency during its assigned transmitting times without interference therebetween, means for synchronizing the time periods and transmission times so that corresponding time periods and transmission times take place simultaneously at all cooperating stations, the time of transmission of said synchronizing impulses to each remote station being determined in the central station from the time of receipt of the impulses from the said remote stations.

13. An air traffic control system including a ground station for monitoring all aircraft flying in a particular area, said ground station and each cooperating aircraft including means for transmitting and receiving on the same frequency and means for keeping time at the same rate and in the same time periods, means for periodically checking the time keeping means at each aircraft and for resynchronizing them to the time keeping means at the ground station whenever deviations occur, said resynchronizing means including control means at the ground station for energizing the transmitting means to transmit synchronizing pulses to each cooperating aircraft at times determined by means in the ground station from the time of receipt at the ground station of transmissions received from the corresponding aircraft, means for assigning distinct transmitting times to each aircraft, means at each aircraft for transmitting during its assigned times including means for encoding each transmission according to the altitude of the associated aircraft, means at the ground station for determining the range therefrom to each aircraft based on the time of receipt of the transmissions from the aircraft, means at the ground station for displaying the location of each aircraft relative to the ground station, means at the ground station for identifying individual aircraft from the time of receipt of transmissions therefrom, other means at the ground station for identifying individual aircraft from the display means, and still other means at the ground station for identifying aircraft at or near the same altitude.

14. The air traffic control system defined in claim 13 wherein said ground station display means includes a control panel having electronic display means thereon, a plurality of multi-position identification switches on the control panel adapted to be adjusted to any transmisssion time within the range thereof, altitude display means associated with the aforesaid identification switch positions and capable of reading the altitude of the corresponding aircraft, other switch means associated with each identification switch position, and means under control of said other switch means for identifying the image of selected aircraft on the display means.

15. The air traffic control system defined in claim 13 including means at the ground station for producing signals which represent in rectangular coordinate form the position of each cooperating aircraft relative to the ground station.

16. A system for monitoring aircraft flying in a given area comprising a ground station located within the given area, said ground station and each aircraft including transmitting and receiving means and means for keeping time in the same preselected time periods and at the same frequency, means for periodically checking the synchronization of the time keeping means at each cooperating aircraft and resynchronizing any such time keeping means which have time periods that do not occur simultaneously with the time keeping means at the ground station, means for assigning a different time interval in each time period to each cooperating aircraft as its assigned transmitting time, each aircraft including means for transmitting in its assigned time intervals information as to its altitude, the receiving means at the ground station receiving transmissions from all of said aircraft in the given area, means responsive to signals received at the receiving means for establishing therefrom the range, direction from the ground station, and altitude of each cooperating aircraft, means at the ground station capable of selecting certain aircraft for more intense monitoring, and means for displaying the location and altitude of each selected aircraft, means for controlling the display means to identify all cooperating aircraft flying at or near the same altitude, and means for identifying aircraft transmitting in non-selected time intervals.

17. Means for monitoring air traffic comprising a ground station including receiving means capable of receiving signals from cooperating airplanes, and transmitting means for transmitting timed pulses to the cooperating airplanes, an image display tube including deflection means for displaying images of all cooperating airplanes within the range thereof, each cooperating airplane including means for transmitting coded altitude information during its assigned transmitting time, said ground station including means for decoding said altitude information, and said ground station including means for identifying airplanes on the basis of altitude, means for converting signals received from each cooperating airplane to impulses to be applied to the deflection means to produce images on the display tube at locations corresponding to the locations of the cooperating airplanes relative to the ground station, precision time keeping means at the ground station including means for controlling the times of transmission of the impulses from the transmitting means to the cooperating airplanes, other means associated with the time keeping means for establishing repeating time intervals each including a plurality of distinct transmission times, means at the ground station for assigning selected ones of said transmission times to individual cooperating airplanes, and means for selecting certain ones of said airplanes for monitoring.

18. An air traffic control system including a ground station for monitoring all aircraft flying in a particular area, said ground station and each cooperating aircraft including means for transmitting and receiving on the same frequency and means for keeping time at the same rate and in the same time periods, means for periodically checking the time keeping means at each aircraft and for resynchronizing them to the time keeping means at the ground station whenever deviations occur, said resynchronizing means including means at the ground station for energizing the transmitting means thereat to transmit synchronizing pulses to each cooperating aircraft at times determined by said resynchronizing means from the time of receipt at the ground station of transmissions received from the corresponding aircraft, means for assigning distinct transmitting times to each aircraft, means at each aircraft for transmitting during its assigned times including means for encoding each transmission according to the altitude of the associated aircraft, means at the ground station for determining the range therefrom to each aircraft based on the time of receipt of the transmissions from the aircraft, means at the ground station for determining the bearing from the ground station to each cooperating aircraft, means at the ground station for displaying the location of each aircraft relative to the ground station, means at the ground station for identifying individual aircraft from the time of receipt of transmissions therefrom, other means at the ground station for identifying individual aircraft from the display means, and still other means at the ground station for identifying aircraft at or near the same altitude.

References Cited
UNITED STATES PATENTS

| | | | |
|---|---|---|---|
| 3,068,473 | 12/1962 | Muth | 343—112 |
| 3,109,170 | 10/1963 | Greene et al. | 343—112 X |
| 3,262,111 | 7/1966 | Graham | 343—7.5 |

RODNEY D. BENNETT, *Primary Examiner.*

CHESTER L. JUSTUS, RICHARD A. FARLEY, *Examiners.*

D. C. KAUFMAN, T. H. TUBBESING, *Assistant Examiners.*